(12) United States Patent
Lin et al.

(10) Patent No.: US 9,052,426 B2
(45) Date of Patent: Jun. 9, 2015

(54) DISPLAY MODULE AND HANDHELD ELECTRONIC DEVICE

(71) Applicant: HTC Corporation, Taoyuan County (TW)

(72) Inventors: Ming-Tien Lin, Taoyuan County (TW); Chih-Jen Hu, Taoyuan County (TW); Chih-Shan Yeh, Taoyuan County (TW); Chin-Chung Shih, Taoyuan County (TW); Yuan-Hung Chang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 56 days.

(21) Appl. No.: 13/632,166

(22) Filed: Oct. 1, 2012

(65) Prior Publication Data

US 2014/0092625 A1    Apr. 3, 2014

(51) Int. Cl.
*F21V 8/00* (2006.01)

(52) U.S. Cl.
CPC .............. *G02B 6/005* (2013.01); *G02B 6/0055* (2013.01); *G02B 6/0045* (2013.01); *G02B 6/0046* (2013.01); *G02B 6/0095* (2013.01); *G02B 6/0096* (2013.01); *G02B 6/0048* (2013.01); *G02B 6/002* (2013.01); *G02B 6/0088* (2013.01); *G02B 6/0093* (2013.01)

(58) Field of Classification Search
CPC .. G02B 6/0011; G02B 6/0045; G02B 6/0046; G02B 6/0048; G02B 6/0095; G02B 6/002; G02B 6/0021; G02B 6/0096

USPC .................. 362/606, 607, 615, 628, 631, 267
See application file for complete search history.

(56) References Cited

U.S. PATENT DOCUMENTS

| | | | |
|---|---|---|---|
| 6,266,123 B1 * | 7/2001 | Maejima et al. | 349/58 |
| 6,942,374 B2 * | 9/2005 | Lee | 362/615 |
| 7,695,150 B2 | 4/2010 | Dejima et al. | |
| 2008/0043171 A1 * | 2/2008 | Takahashi et al. | 362/561 |
| 2008/0291356 A1 * | 11/2008 | Kim | 362/633 |
| 2012/0113674 A1 * | 5/2012 | He et al. | 362/606 |

FOREIGN PATENT DOCUMENTS

| | | | |
|---|---|---|---|
| CN | 101726788 A | * | 6/2010 |
| CN | 102109131 | | 6/2011 |
| TW | 201011403 | | 3/2010 |
| TW | 201134380 | | 10/2011 |

OTHER PUBLICATIONS

"Office Action of Taiwan Counterpart Application", issued on Aug. 20, 2014, p1-p5, in which the listed references were cited.

\* cited by examiner

*Primary Examiner* — Y M Lee
(74) *Attorney, Agent, or Firm* — Jianq Chyun IP Office

(57) ABSTRACT

A display module is provided. The display module includes a frame, a light guide plate, a light source device, a display panel and an optical film. The light guide plate is accommodated within the frame. The light guide plate has a recess. The light source device is disposed between the frame and the light guide plate. The display panel is disposed on the recess and attached to the light guide plate to seal the recess. The optical film is located within the recess. A handheld electronic device having said display module is also provided.

10 Claims, 5 Drawing Sheets

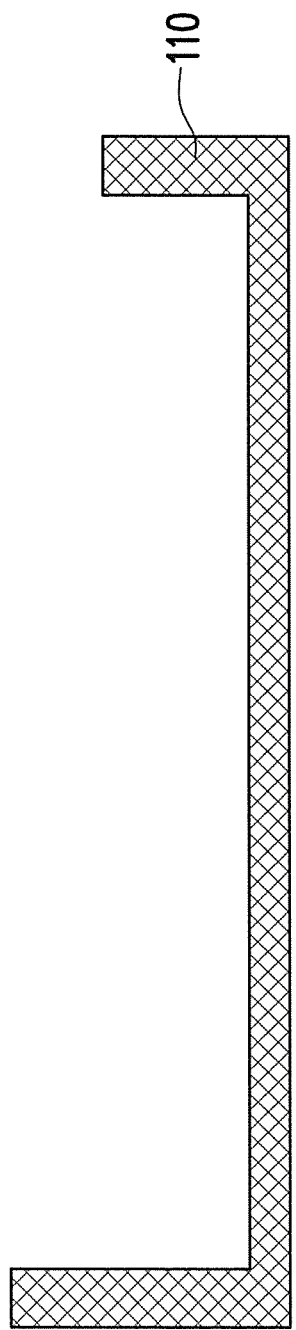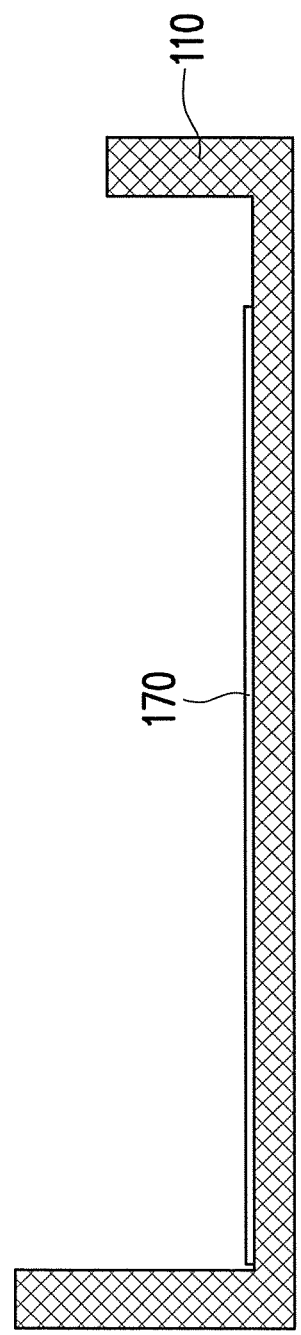

DISPLAY MODULE AND HANDHELD ELECTRONIC DEVICE

BACKGROUND OF THE DISCLOSURE

1. Field of the Disclosure

The disclosure relates to a display module and an electronic device using the same. More particularly, the disclosure relates to a display module having a waterproof function and a handheld electronic device adopting said display module.

2. Description of Related Art

A handheld electronic device is an electronic device capable of hand-held and operated by a user, such as a cell phone, a tablet PC or an eBook. A body of the handheld electronic device is mounted with a display module for displaying useful information.

One of the waterproof methods for the handheld electronic device in prior art is by installing an O-ring on a specific position of the handheld electronic device to avoid moisture from entering the display module of the handheld electronic device. However, the O-ring may restrict the handheld electronic device in terms of the design of appearance. Another waterproof method used in the prior art is by coating an insulation material onto the electronic devices of the circuit board for moisture blockage. However, such method cannot provide an effective water resistance for the display module.

More particularly, an optical film of the display module in prior art is located between the display panel and the light guide plate. Once moisture enters the display module, optical characteristics of the optical film is then affected with damp. As a result, an uneven back light source of the display module may occur and cause a mura problem on the display panel, which further affects display quality of the display module.

SUMMARY OF THE DISCLOSURE

The disclosure is directed to a display module having a preferable water-proof function and capable of protecting an optical film therein, allowing the optical to stay away from moisture, foreign particles or dust, so that its display quality can be ensured.

The disclosure is further directed to a handheld electronic device adopting said display module.

The disclosure provides a display panel. The display module includes a frame, a light guide plate, a light source device, a display panel and an optical film. The light guide plate accommodated within the frame, the light guide plate has a recess. The light source device is disposed between the frame and the light guide plate. The display panel is disposed on the recess and attached to the light guide plate to seal the recess. The optical film is located within the recess.

The disclosure further provides a handheld electronic device. The handheld electronic device includes a body and above display module. The body has a display opening. The display module is disposed within the display opening.

According to an embodiment of the disclosure, the display module further includes a waterproof adhesive-material surrounding the recess, in which the display panel is attached to the light guide plate through the waterproof adhesive-material.

According to an embodiment of the disclosure, said light guide plate includes a flat portion, a light incident portion and a plurality of sidewall portions. The light incident portion and the sidewall portions stand on an edge of the flat portion to collectively form the recess. The light source device faces the light incident portion of the light guide plate.

According to an embodiment of the disclosure, a material of the sidewall portion includes non-transparent materials.

According to an embodiment of the present disclosure, said light incident portion has an inclined surface, the inclined surface connects to a top surface of the flat portion.

According to an embodiment of the disclosure, the display module further includes a reflector disposed at a bottom portion of the flat portion.

According to an embodiment of the disclosure, said light source device is disposed at a bottom surface of the display panel.

According to an embodiment of the disclosure, the display module further includes a first flexible print circuit board disposed at the bottom surface of the display panel. The first flexible print circuit board is electrically connected to the light source device and extended outside of the frame.

According to an embodiment of the disclosure, the display module further includes a driving element disposed at a top surface of the display panel.

According to an embodiment of the disclosure, the display module further includes a second flexible print circuit board disposed at the top surface of the display panel. The second flexible print circuit board is electrically connected to the driving element and extended to connect the first flexible print circuit board.

In view of above, the light guide plate of the disclosure is designed to have a structure of a recess, and the display panel is disposed on the recess and attached to the light guide plate to seal the access. The optical film is disposed within the recess. The recess may be sealed to avoid moisture, foreign particles or dust from entering gaps between the light guide plate and the display panel to affect optical characteristics of the optical film. As a result, display quality of the display module may be ensured, accordingly.

To make the above features and advantages of the disclosure more comprehensible, several embodiments accompanied with drawings are described in detail as follows.

BRIEF DESCRIPTION OF THE DRAWINGS

FIGS. 3A to 3F are schematic views illustrating an assembling process of assembling method for the display module in FIG. 1.

DESCRIPTION OF THE EMBODIMENTS

Figure 1:
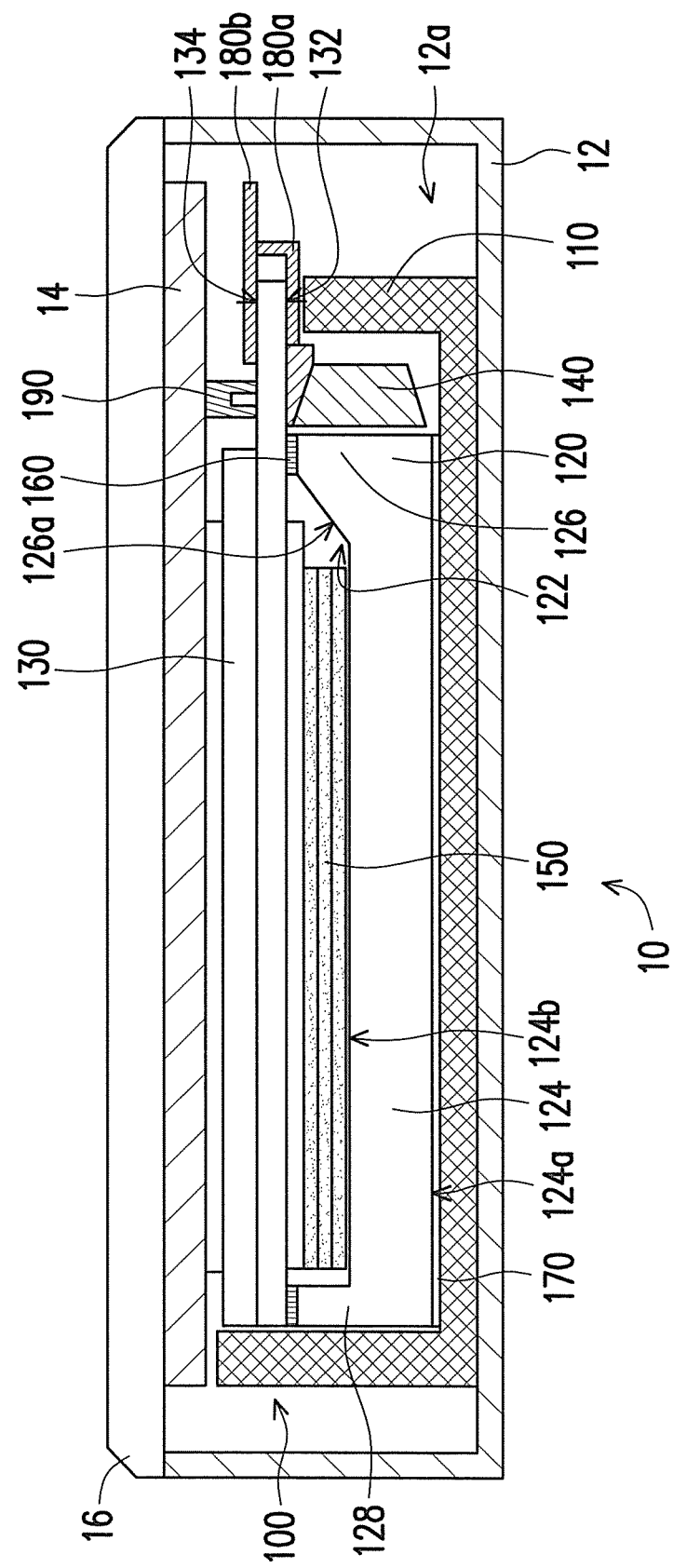
FIG. 1 is a sectional view of a handheld electronic device according to an embodiment of the disclosure.

FIG. 1 is a sectional view of a handheld electronic device according to an embodiment of the disclosure. Referring to FIG. 1, a handheld electronic device 10 of the present embodiment may be, for example, a cell phone, a tablet PC or an eBook.

The handheld electronic device 10 includes a body 12 and a display module 100. The body 12 has a display opening 12a. The display module 100 is disposed within the display opening 12a.

In the present embodiment, the display panel 100 includes a frame 110, a light guide plate 120, a display panel 130, a light source device 140 and an optical film 150. The light guide plate 120 is accommodated within the frame 110. The display panel 130 is located between the light guide plate 120 and the display opening 12a. The light source device 140 is disposed between the frame 110 and the light guide plate 120, and the light source device includes light-emitting diodes (LED). Accordingly, the light source device 140 may provide a back light source required for the display panel 130 to screen display. Users may watch the screen displayed by the display panel 130 through the display opening 12a.

Figure 2:
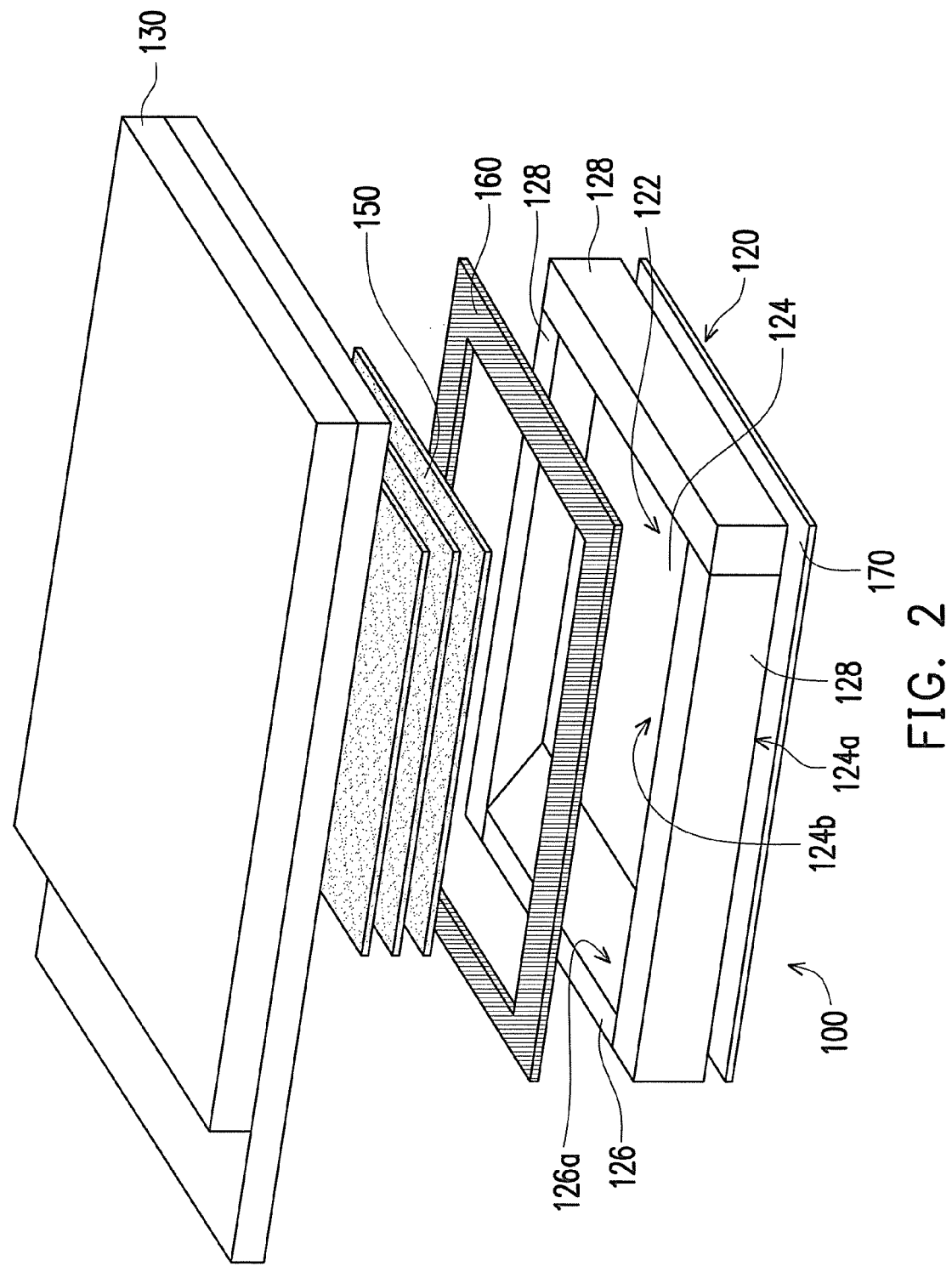
FIG. 2 is an exploded view of the display module in FIG. 1.

FIG. 2 is an exploded view of the display module in FIG. 1. In order to simplify the description, the frame of the display module is omitted in FIG. 2. Referring to FIGS. 1 and 2, the light guide plate 120 of the present embodiment has a recess 122. The optical film 150 is located within the recess 122. Herein, the optical film 150 of the present embodiment may be, for example, a combination of one or more elements selected from a group consisting of a brightness-enhanced film, a light-collecting film and a diffusion film, but the disclosure is not limited thereto. In addition, the display panel 130 is disposed on the recess 122 and closely attached to the light guide plate 120 to seal the recess 122. The optical film 150 is disposed within the recess 122. With such disposition, the recess 122 may be sealed to avoid moisture or foreign particles from penetrating within the recess 122 though gaps between the light guide plate 120 and the display panel 130. Therefore, the optical film 150 in the recess 122 may be effectively protected to ensure its optical characteristics, so that the display module 100 may maintain a preferable displaying quality. In the present embodiment, various feasible methods may be used to attach the display panel 130 onto the light guide plate 120. For instance, as shown in FIGS. 1 and 2, in the present embodiment, a waterproof adhesive-material 160 may be circularly disposed around the recess 122 of the light guide plate 120, such that display panel 130 and the light guide plate 120 may be bonded by the waterproof adhesive-material 160. Nevertheless, in other embodiments, any bonding method capable of accomplish similar sealing effect may be applied in between the touch panel 130 and the light guide plate 120.

On the other hand, the light guide plate 120 of the present embodiment includes a flat portion 124, a light incident portion 126 and three sidewall portions 128. The light incident portion 126 and the sidewall portions 128 stand on an edge of the flat portion 124 to collectively form the recess 122. More specifically, the sidewall portions 128 and the flat portion 124 may be formed integrally. Or, the sidewall portions 128 and the flat portion 124 may also be fabricated separately before bonding to each other. In the present embodiment, the sidewall portions 128 may be fabricated by non-transparent materials such as Polycarbonate, or plastics doped with certain proportion (e.g., 20% to 40%) of glass fiber, so as to enhance hardness of the sidewall portions 128. As a result, the sidewall portions 128 may have a shading effect for ensuring light emitted from the light source device 140 does not leak outside of the sidewall portions 128, so as to avoid leakage of light from the periphery of the display module 100. Further, in order to form the sidewall portions 128 which is non-transparent, the light guide plate 120 may be fabricated by using a dual-material injection molding technique to firmly bond the portions made of different materials.

The display module 100 may further include a reflector 170 disposed at a bottom portion 124a of the flat portion 124. In the present embodiment, the reflector 170 may be attached to the bottom portion 124a of the flat portion 124 using an optical glue (not illustrated), so as to increase light efficiency of the light guide plate 120. In addition, the light incident portion 126 may be designed to have an inclined surface 126a, the inclined surface 126a may connect to a top surface 124b of the flat portion 124. Moreover, the light source device 140 of the present embodiment is disposed at a bottom surface 132 of the display panel 130 and faces the light incident portion 126 of the light guide plate 120. Accordingly, light emitted from the light source device 140 may be guided by the inclined surface 126a on the light incident portion 126 to enter the flat portion 124.

In the embodiment, the display module 100 may further include a first flexible print circuit board (FPC) 180a, a second flexible print circuit board 180b and a driving element 190. The first flexible print circuit board 180a is disposed at the bottom surface 132 of the display panel 130 and extended outside of the frame 110. The first flexible print circuit board 180a is electrically connected to the light source device 140. The second flexible print circuit board 180b and the driving element 190 are disposed at a top surface 134 of the display panel 130. The driving element 190 may be, for example, a gate driver, a source driver of the display panel 130 or other possible elements. The second flexible print circuit board 180b is electrically connected to the driving element 190 and may be extended to connect the first flexible print circuit board 180a.

In the present embodiment, the handheld electronic device 10 further includes a touch panel 14. The touch panel 14 is disposed on the display module 100 for users to enter information or operating instructions to the handheld electronic device 10. Nevertheless, in other embodiments, the handheld electronic device 10 may also be a non-touch control device without the touch panel 14, the disclosure is not limited thereto. In addition, the handheld electronic device may also be disposed with a cover plate 16. The covering plate 16 may be attached to the touch panel 14 through the optical glue, such that not only appearance of the handheld electronic device 10 may be prettified, the cover plate covered on the touch panel 14 may also protect the touch panel 14 from damaged by external forces.

The display module 100 of the handheld electronic device 10 as illustrated in FIG. 1 is used hereinafter to further describe a assembling method for the display module according to the disclosure.

FIGS. 3A to 3F are schematic views illustrating an assembling process of assembling method for the display module in FIG. 1. First, referring to FIG. 3A, a frame 110 is provided.

Figure 3C:
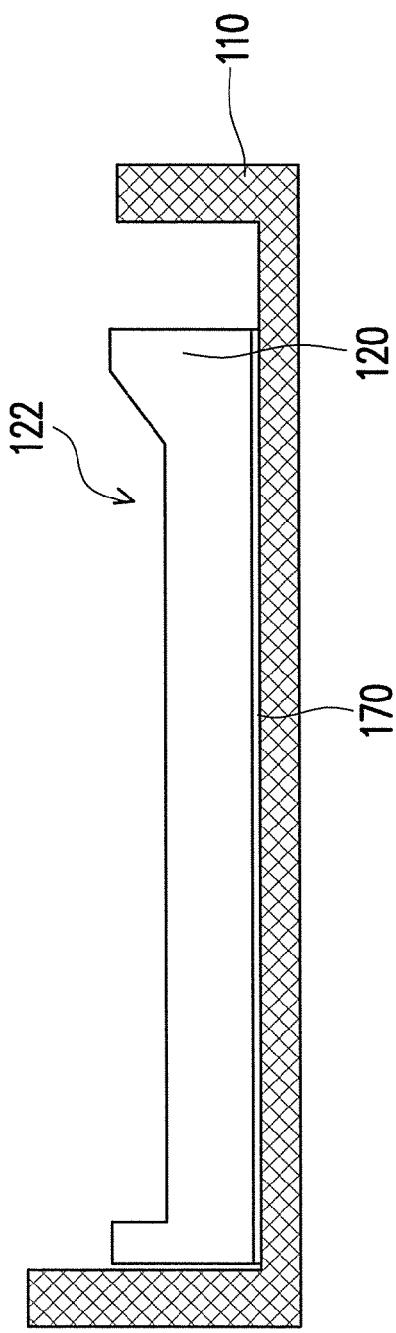

Next, referring to FIG. 3B, a reflector 170 is attached to the frame 110. Further, as shown in FIG. 3C, the light guide plate 120 is attached on the reflector 170, wherein the light guide plate 120 has a recess 122.

Figure 3D:
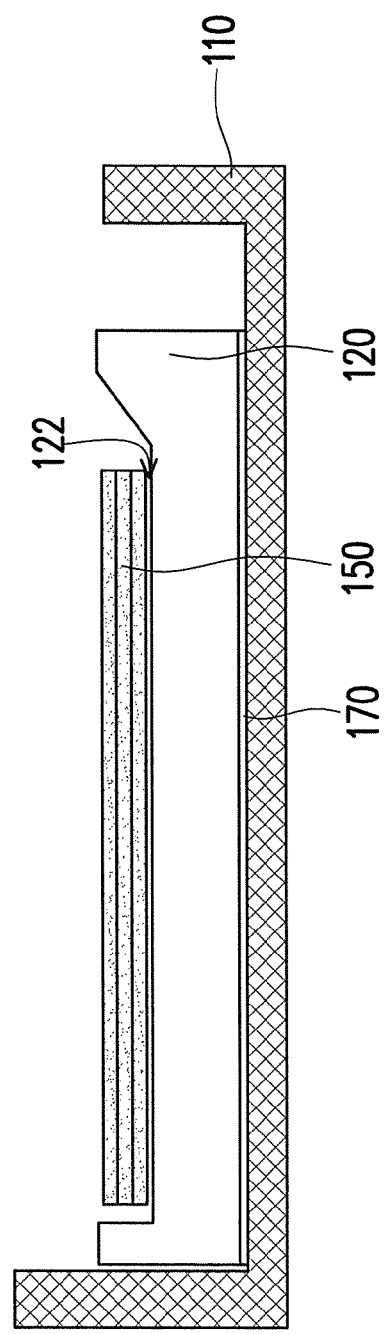
Figure 3E:
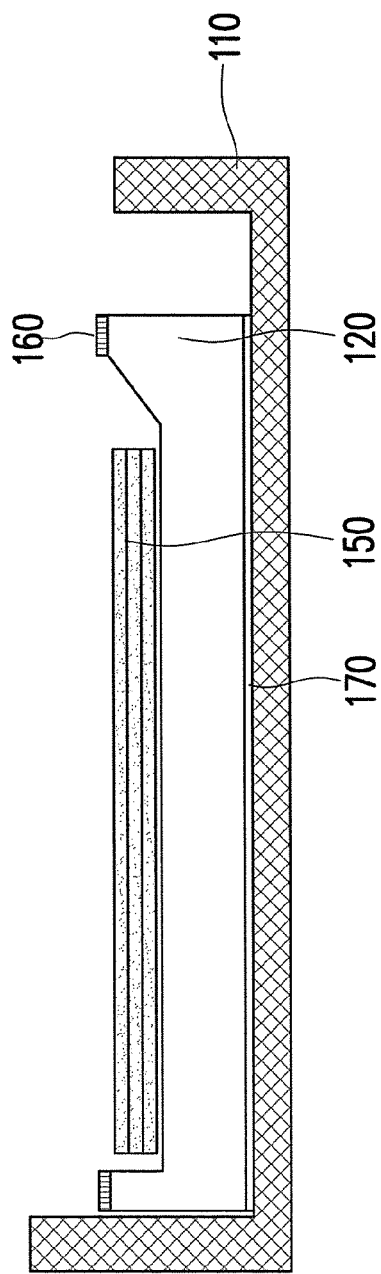
Figure 3F:
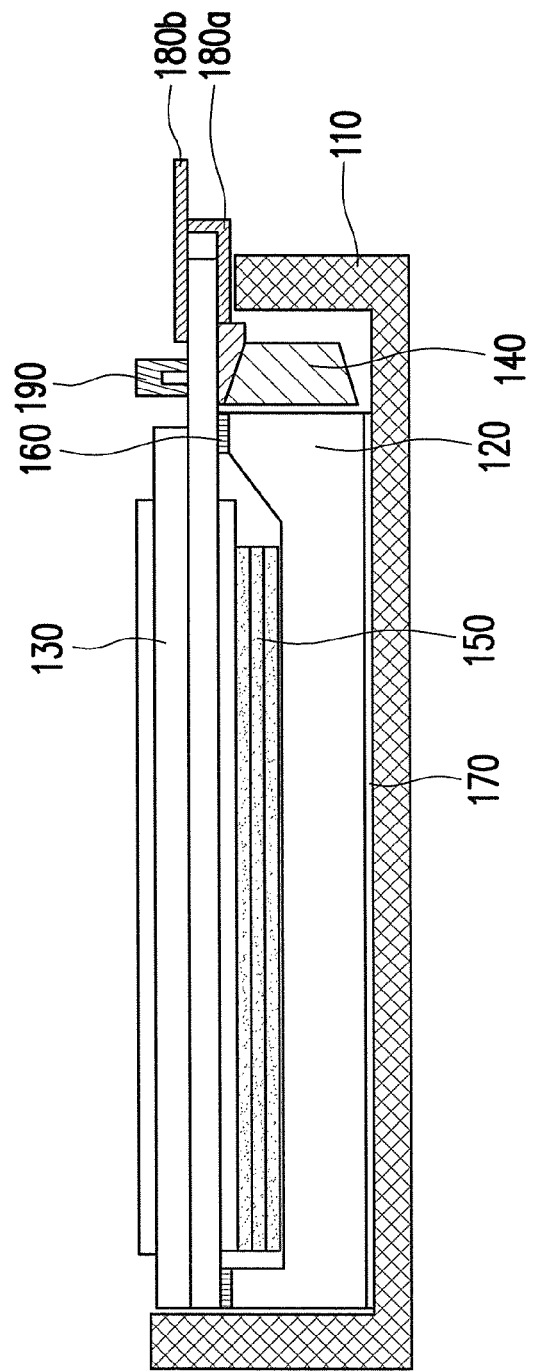

Referring to FIG. 3D, an optical film 150 is disposed within the recess 122. Next, as shown in FIG. 3E, a waterproof adhesive-material 160 is circularly disposed around the recess 122 of the light guide plate 120. Next, as shown in FIG. 3F, the display panel 130 and the light source device 140 are assembled on the frame 110. In which, the display panel 130 is disposed on the recess 122 and closely attached to the light guide plate 120 to seal the recess 122, whereas the light source device 140 is disposed between the frame 110 and the light guide plate 120. The assembling process of the display module 100 is completed hereto.

Of course, the step of assembling the touch panel 130 and the light source device 140 includes disposing a first flexible print circuit board 180a, a second flexible print circuit board 180b and a drive element 190 to the display panel 130. In which, the first flexible print circuit board 180a is electrically connected to the light source device 140, the second flexible print circuit board is electrically connected to the driving element 190 and may be extended to connect the first flexible print circuit board 180a.

Afterwards, the display module 100 may be disposed to the display opening 12a of the body 12 as shown in FIG. 1, and the touch panel 14 may then disposed on the display module 100, and the cover plate 16 may be attached to the touch panel 14 through the optical glue. As a result, the handheld electronic device 10 as shown in FIG. 1 is assembled.

In view of above, the light guide plate of the disclosure is designed to have a structure of a recess, and an optical film is disposed within the recess. In addition, the display panel is attached to the light guide plate to seal the recess. The recess may be sealed to avoid moisture or foreign particles from penetrating within the recess though gaps between the light guide plate and the display panel to affect optical characteristics of the optical film. As a result, display quality of the display module may be ensured, accordingly.

Although the disclosure has been described with reference to the above embodiments, it is apparent to one of the ordinary skill in the art that modifications to the described embodiments may be made without departing from the spirit of the disclosure. Accordingly, the scope of the disclosure will be defined by the attached claims not by the above detailed descriptions.

What is claimed is:

1. A display module, comprising:
   a frame;
   a light guide plate accommodated within the frame, the light guide plate has a recess;
   a light source device disposed between the frame and the light guide plate;
   a display panel disposed on the recess and attached to the light guide plate to seal the recess airtightly, wherein a portion of the display panel is disposed outside of the light guiding plate for fixing the light source device at a bottom surface of the display panel;
   an optical film located within the recess; and
   a waterproof adhesive-material surrounding the recess, wherein the display panel is attached to the light guide plate through the waterproof adhesive-material.

2. The display module of claim 1, wherein the light guide plate has a flat portion, a light incident portion and a plurality of sidewall portions, the light incident portion and the sidewall portions stand on an edge of the flat portion to collectively form the recess, and the light source device faces towards the light incident portion of the light guide plate.

3. The display module of claim 2, wherein a material of the sidewall portion comprises non-transparent materials.

4. The display module of claim 2, wherein the light incident portion has an inclined surface, the inclined surface connects to a top surface of the flat portion.

5. The display module of claim 2, further comprising:
   a reflector disposed at a bottom portion of the flat portion.

6. The display module of claim 1, wherein the light source device is disposed at a bottom surface of the display panel.

7. The display module of claim 6, further comprising:
   a first flexible print circuit board disposed at the bottom surface of the display panel, the first flexible print circuit board is electrically connected to the light source device and extended outside of the frame.

8. The display module of claim 7, further comprising:
   a driving element disposed on a top surface of the display panel.

9. The display module of claim 8, further comprising:
   a second flexible print circuit board disposed at the top surface of the display panel, the second flexible print circuit board is electrically connected to the driving element and extended to connect the first flexible print circuit board.

10. A handheld electronic device, comprising:
    a body having a display opening; and
    the display module of claim 1, disposed at the display opening.

* * * * *